(12) United States Patent
Hansen et al.

(10) Patent No.: US 7,452,518 B2
(45) Date of Patent: Nov. 18, 2008

(54) PROCESS FOR TREATING SYNTHETIC SILICA POWDER AND SYNTHETIC SILICA POWDER TREATED THEREOF

(75) Inventors: Richard L. Hansen, Mentor, OH (US); Theodore P. Kircher, Ashtabula, OH (US); Douglas M. Korwin, Copley, OH (US)

(73) Assignee: Momentive Performance Materials Inc., Albany, NY (US)

( * ) Notice: Subject to any disclaimer, the term of this patent is extended or adjusted under 35 U.S.C. 154(b) by 414 days.

(21) Appl. No.: 11/266,575

(22) Filed: Nov. 2, 2005

(65) Prior Publication Data
US 2006/0137400 A1 Jun. 29, 2006

Related U.S. Application Data

(60) Provisional application No. 60/639,703, filed on Dec. 28, 2004.

(51) Int. Cl.
*C01B 33/158* (2006.01)
(52) U.S. Cl. .................. 423/325; 423/335
(58) Field of Classification Search .......... None
See application file for complete search history.

(56) References Cited

U.S. PATENT DOCUMENTS

| | | | | |
|---|---|---|---|---|
| 3,015,541 A | * | 1/1962 | Drake | ............ 423/335 |
| 5,516,350 A | | 5/1996 | Onoda et al. | |
| 6,746,655 B1 | | 6/2004 | Becker et al. | |
| 2003/0124044 A1 | | 7/2003 | Fukui et al. | |

FOREIGN PATENT DOCUMENTS

| | | | |
|---|---|---|---|
| JP | 56-104732 | * | 8/1981 |
| JP | 06-040713 | | 2/1994 |
| WO | WO 2003062166 A2 | * | 7/2003 |

OTHER PUBLICATIONS

English language translation of portion of JP 56-104732 into English.*
abstract for Uses of Ultraviolet/ozone for Hydrocarbon Removal: Applications to Surfaces of Complex Composition or Geometry authored by McIntyre et al. and published in the Journal of Vacuum Science and Technology, A: Vacuum, Surfaces, and Films (1991), 9(3, pt. 2) 1355-9.*

* cited by examiner

*Primary Examiner*—Marc S Zimmer
(74) *Attorney, Agent, or Firm*—Dominick G. Vicari

(57) ABSTRACT

A process for producing a synthetic quartz glass powder which is substantially free of carbon contaminant, for reduced bubble density and improved stability of articles made from the synthetic quartz glass during fusion molding by maintaining the synthetic silica powder in an oxidizing environment, e.g., an atmosphere comprising at least 3 vol. % ozone at a temperature of less than 1400° C., causing carbon containing compounds to be reduced to less than 10 ppm.

24 Claims, 1 Drawing Sheet

PROCESS FOR TREATING SYNTHETIC SILICA POWDER AND SYNTHETIC SILICA POWDER TREATED THEREOF

CROSS REFERENCE TO RELATED APPLICATIONS

This application claims the benefits of U.S. 60/639,703 filed Dec. 28, 2004, which patent application is fully incorporated herein by reference.

FIELD OF THE INVENTION

The present invention relates to a synthetic quartz glass powder for use as a raw material for quartz articles used in the field of semiconductor industry.

BACKGROUND OF THE INVENTION

Single crystal silicon, the starting material for most semiconductor electronic component fabrication, is commonly prepared by the so-called Czochralski ("Cz") method. Using the Cz method, crystal growth is commonly carried out in a crystal-pulling furnace, wherein polycrystalline silicon ("polysilicon") is charged to a crucible and melted by a heater surrounding the crucible. A seed crystal is brought into contact with the molten silicon and a single crystal ingot is grown by extraction via a crystal puller. Crucibles used in conventional crystal pullers are commonly constructed of quartz because of its purity, temperature stability and chemical resistance. Natural quartz, even high quality, contains various metallic impurities and is not entirely satisfactory in respect of purity. If metallic impurities contaminate high-purity single silicon crystals, the performance of the semiconductors produced therefrom is adversely affected. Thus, high-purity synthetic quartz glass powder has been used for making crucibles.

One method for making high-purity synthetic quartz glass powder is via the sol-gel method using alkoxysilane as a raw material. In this process, however, 100% of the alkoxy groups are not reacted and some of them remain in the dry gel as bound alkoxy groups. Also, the alcohols generated as by-product of the reaction are partly left in the dry gel, for a carbon concentration in the dry gel of up to 1,000 ppm. When such carbon contaminant intermixes in a synthetic quartz powder product, it may give rise to CO or CO2 gas causing foaming or bubbles, when the powder product is fused for molding into a crucible or an ingot. The bubble-containing quartz crucibles may cause various problems, such as deterioration of dimensional stability in use at a high temperature and bursting of the bubbles during growth of single crystals causing crystal defects.

Applicants have developed a process for controlling/improving bubble stability in quartz crucibles by controlling the amount of impurities in the synthetic silica feed. A number of methods have been proposed to reduce impurities by treating synthetic quartz powder at a high temperature. U.S. Pat. No. 5,516,350 discloses a method to reduce the carbon concentration by treating the synthetic quartz powder in an atmosphere with an oxygen concentration of >30 vol. % at a temperature of at least 1000° C. JP Publication No. 06-040713 discloses treating synthetic quartz glass powder with gaseous chlorine or a chlorine-containing gas at an amount of 0.1 to 10% Cl at a temperature of 1000 to 1500° C. to reduce the OH level to ~45 ppm. U.S. Patent Publication No. 20030124044 discloses treating synthetic silica powder in a helium atmosphere of 700 to 1400° C. for at least 1 hour, to reduce the carbon residual to less than 2 ppm and the OH group to less than 50 ppm.

There is still a need for an economical and efficient method to reduce bubble density and improve bubble stability in crucibles by controlling impurity levels in synthetic silica powder feed. Furthermore, there is still a need to reduce impurity levels in synthetic silica powder feed for use in the manufacture of optical and semiconductor components such as crucibles, glass

SUMMARY OF THE INVENTION

The invention relates to a process for producing a synthetic quartz glass powder which is substantially free of carbon contaminant, for reduced bubble density and improved stability of articles made from the synthetic quartz glass during fusion molding. In this process, synthetic silica powder is maintained under an oxidizing atmosphere at a temperature of less than 1400° C., causing carbon-containing compounds to be driven off in gaseous form. In one embodiment, the oxidizing atmosphere comprises at least 3 vol. % ozone.

In a second aspect of the present invention, there is provided a process for reducing carbon contaminant in a quartz glass powder, which process comprises treating the quartz glass powder in an oxidizing environment, e.g., treatment with a gas stream comprising at least 30 vol. % oxygen concentration, at a temperature of less than 1000° C.

DETAILED DESCRIPTION OF THE INVENTION

Figure 1:
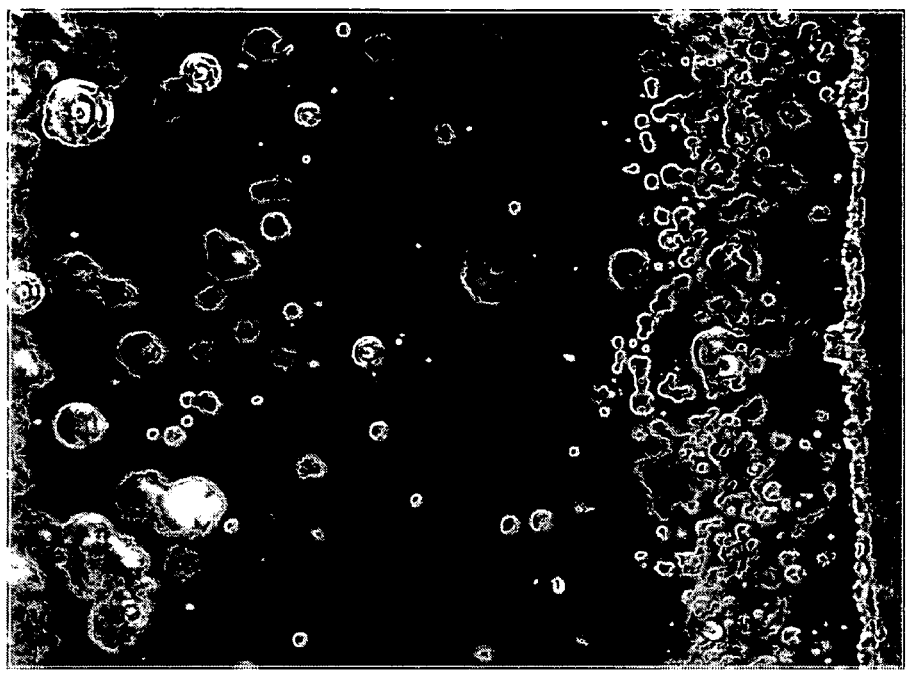
FIG. 1 is a Microphotograph illustrating a coupon sample from a crucible made with untreated synthetic sand.

As used herein, approximating language may be applied to modify any quantitative representation that may vary without resulting in a change in the basic function to which it is related. Accordingly, a value modified by a term or terms, such as "about" and "substantially," may not to be limited to the precise value specified, in some cases.

As used herein, quartz powder is used interchangeably with sand, silica, or glass to refer to amorphous silica powder ($nSiO_2$), and synthetic silica sand or synthetic silica powder refers to any man-made (and not natural) sand that can be used as the raw material feed for making optical and semiconductor components such as crucibles, or for use in making components of illumination systems or projection systems, such as a lens, a prism and a beam splitter of an ArF excimer laser.

As used herein, "fill" may be used to mean a bulk deposit of still to be cleaned/purified quartz powder or silica powder.

As used herein, "processing temperature" may be used interchangeably with the term "process temperature," "heat treating temperature," or "treatment temperature," which refers to the lowest temperature in the equipment/step in the process for treating the quartz powder.

As used herein, the phrase "effective amount" or "sufficient amount" means that amount sufficient to bring about the desired effect, e.g., to reduce the carbon impurity concentration in the input silica powder feed to a desired level, e.g., less than 10 ppm, as compared to an untreated silica powder feed.

As used herein, oxidizing atmosphere or oxidizing gas means an atmosphere or environment containing a sufficient amount of oxygen or ozone to reduce the carbon impurity concentration in the input silica powder feed to less than 110 ppm.

It is desirable to use synthetic quartz powder for making products such as articles for heat-treating semiconductors. Synthetic quartz is made via a number of processes in the art, including the common sol-gel process. In this process, alkoxysilane or silicic salt is hydrolyzed to form a silica gel powder, e.g., ethyl-silicate is hydrolyzed to be gelled $(nSi(OH)_4)$. The gelled ethyl-silicate is pulverized and dried to obtain a silica gel powder, and the silica-gel powder is baked at a predetermined temperature (about 1050° C.) and dehydrated to obtain a silica powder. In another process called colloid dispersion, fumed silica is dispersed in water and transformed into a silica gel. In yet another process, a high purity silica product is made by vapor deposition, wherein a vaporized precursor compound of silicon is fed to a synthesis flame where it is oxidized or hydrolyzed to form a stream of silica fume or a flow of micro-particles of silica. The silica deposits either as a porous silica soot body, which may be dehydrated or doped by heating in a suitable atmosphere, and then sintered to pore-free glass.

Raw Materials for Treatment. To obtain high purity silica in the process of the invention, natural sand or any synthetic silica sand as manufactured by any of the processes known in the art can be used as the starting raw material to be purified.

Depending on the end-use applications, the starting material may be synthetic silica sand as manufactured, having a particle size distribution ranging from 10 to 1000 microns. In one embodiment, the particle size of the synthetic silica ranges from 50 to 1000 microns. In another embodiment, from 100 to 500 microns in diameter. In yet another embodiment, from 100 to 300 microns with the average particle size of 150 to 200 microns, for use in the manufacturing of crucibles.

When synthetic sand is used as the raw material, the starting synthetic sand may comprise carbon as an impurity as well as other impurities such as organic compounds, organic fragments, alkali metals, alkaline earth metals, silica rock, silica sand, α-quartz, cristobalite, and the like. In one embodiment, the synthetic sand raw material has a starting carbon concentration (in the form of bound alkoxy groups) of 1,000 to 10,000 ppm. In another embodiment, after the synthetic sand undergoes treatments as specified in JP Publication No. 06-040713, the synthetic sand has a starting carbon concentration of about 45-50 ppm. The starting synthetic silica may further comprise from 1 to 10 wt. % in terms of water content depending on whether the silica gel has been dried out by heating at 100 to 200° C. in vacuum or inert gas.

In the treating process of the invention, the starting silica powder may be "raw" untreated synthetic silica powder of starting carbon impurities level of 0.5 to 2 wt. %. In another embodiment, it may be "treated" synthetic sand with a carbon level of 45 ppm. Using "treated" synthetic sand as the feed to the process of the invention may cut down on the amount of time required for treatment, but it is not necessary to do so. Impurity materials which can react with the synthetic silica at fusion temperatures to create bubbles in the fused silica will be removed in the treating process of the invention.

Oxidizing Treatment Gas for Treating Sand: In one embodiment, the treating process in oxidizing conditions using an oxidizing gas to cause carbon compounds to be driven off in gaseous form. In one embodiment, the oxidizing gas comprises ozone. In another embodiment, the oxidizing environment comprises ozone and at least one of oxygen, helium, chlorine, fluorine, bromine, iodine, and mixtures thereof. In yet another embodiment, the oxidizing gas comprises at least one of helium, nitrogen, neon, argon, krypton, carbon monoxide, carbon dioxide or mixtures thereof.

In one embodiment, Applicants found the use of ozone in the treatment gas allow the removal of oxidizable impurities to a level of <2 ppm carbon at a relatively low temperature compared to that of the prior art of >1000° C. In one embodiment, the amount of ozone in the oxidizing gas ranges from 5 to 20 vol. %. In another embodiment, from 3 to 15 vol. %, and in a third embodiment, from 5 to 10 vol. %. In another embodiment, the gas flow comprises 71 vol. % helium and <30 vol. % oxygen with 5-10 vol. % ozone.

In one embodiment, the treatment gas contains at least 20 vol. % of oxygen. In another embodiment, the amount of O2 in the gas is at least 50 vol. %. In a third embodiment, of at least 90 vol. %.

In one embodiment, the treatment gas is recirculated, i.e., the waste gas after treating the sand is regenerated and again charged to the process as a treatment gas. To balance any gas consumption, regeneration may comprise an admixture of fresh, unused treatment gas.

Equipment for use in the Treatment Process: In one embodiment, the heat treatment is done via the use of an electric oven, wherein the oxidizing gas is continuously introduced to remove the undesirable oxidizable materials. In another embodiment, the treatment is done via the use of a fluidization bed.

In one embodiment of a fluidization bed operation, the treatment gas is introduced into the silica sand by means of a gas shower having numerous nozzle openings below the sand fill, which are distributed laterally to the center axis. The gas shower has nozzle openings which are essentially symmetrically distributed over the cross-section of the silica (underneath the silica particles to be cleaned) as viewed in direction of the flow, and from which the treatment gas will flow. In one embodiment, the gas shower comprises a temperature resistant material, for example of quartz glass, silicon carbide or a precious metal, such as platinum or a platinum alloy. In one example, the gas shower is designed in the form of a tube provided with nozzle openings. The tube may have a multitude of forms, for example, the form of a spiral. The gas shower may also be designed as a perforated plate or a frit.

In one embodiment with the use of a distributing nozzle, the treatment gas will largely flow laminarly through the fluidized silica layer for a homogeneous gas distribution so that the silica particles are homogeneously charged with the treatment gas. Blind spots in the area of the silica particle layer will be avoided as far as possible so that the contaminations are able to react completely and uniformly. This will achieve a cleaning effect by the treatment gas which is done as completely and uniformly as possible. Moreover, due to the fact that the individual silica particles are kept moving in the fluidized bed, the risk of sintering of the particles can be reduced.

In one embodiment, the equipment further comprises a heating device to heat the treatment gas prior to introducing into the silica to be treated. Thus, the treatment gas can be heated to a temperature of above the treatment temperature. In one embodiment, the heating device comprises a heated tubular coil. With the use of a tubular coil, the temperature of the treating gas can be controlled by adjusting the heating tube to the heating requirements.

Silica Treatment Process. The process of the present invention to purify or heat-treat the silica can be run batch-wise or on a continuous basis, to remove residual carbon and organics in the silica raw materials to less than 10 ppm. Prior to heat treatment using the oxidizing process of the invention, steam may be optionally passing through the dry gel to accelerate the carbon removal speed.

In the process, the heat-treating temperature, pressure, and time vary depending on the gas mixture used, the type of raw materials to be treated, i.e., synthetic or natural silica, and the desired carbon impurity level, with the time typically ranges from 30 minutes to 15 hrs. to bring the carbon level down to 2 ppm or less. In one embodiment, the contact time or dwell time for the silica in a fluidized be reactor is about 12 hrs.

In one embodiment, the heat-treating process is done at atmospheric pressure. In another embodiment, the heat treatment is carried out in a vacuum at a pressure of 5 Pa or less.

In one embodiment of a process, a treatment gas containing up to 10 vol. % ozone is introduced and maintained for a sufficient amount of time and at a sufficient temperature, e.g., less than 1400° C., to bring the carbon content to 10 ppm or less. In one embodiment, the carbon content is reduced to 2.5 ppm or less. In a third embodiment, the residual carbon and organics level is reduced to less than 0.5 ppm. In a fourth embodiment, the residual carbon and organics level is reduced to less than 0.25 ppm. In yet a fifth embodiment, the carbon concentration is reduced to less than 5 ppm and the OH group in the silica powder is reduced to less than 50 ppm.

In one embodiment of the invention, the oxidizing condition is carried out at a heat-treating temperature of 260 to 1000° C. However, the treating process of the present invention may still be successfully carried out at a higher temperature, i.e., is ranging up to 1400° C. In one embodiment, the temperature is kept in the range of 800 to 1100° C. In yet a third embodiment, the temperature is kept in the range of 600 to 1200° C. In a fourth embodiment, the temperature is kept in the range of 500 to 1100° C. In one embodiment of the invention, the oxidizing condition is carried out at a temperature of 260 to 1000° C. at atmospheric pressure.

In one embodiment, the silica purification is carried out at a temperature of 500 to 1000° C., with a treatment gas comprising oxygen at a level of at least 50 vol. %. In another embodiment, the silica purification is carried out with in an oxidizing gas comprising ozone in air, heated to a temperature ranging from 400-1200° C. at atmospheric pressure. In a third embodiment, the purification is accomplished with a flow of air as the treatment gas, heated to a temperature of 600-1000° C.

In one embodiment, the treatment gas is passed through the silica to be treated at a flow velocity of at least 10 cm/s. This will ensure that carbon and other organic impurity matters will be removed as fast as possible from the particles and discharged from the reactor. In another embodiment, the flow velocity of the treatment gas is adjusted to at least 20 cm/s. In yet another embodiment, the flow velocity of the treatment gas is adjusted to at least 30 cm/s.

The treated synthetic silica powder of the invention typically has a carbon level of less than 2 ppm. In one embodiment, the carbon impurity level is measured at 1.0 ppm or less. In a third embodiment, the carbon level is down to 0.5 ppm or less.

In one embodiment, a fluidized bed reactor may be installed in series prior to the processing equipment of the invention, wherein the feed silica powder is pre-treated with a chloric treatment gas to reduce metallic impurities such as iron (to less than 20 ppb), manganese (to less than 30 ppb), lithium (to less than 50 ppb), as well as chromium, copper, and nickel (to less than 20 ppb). In another embodiment, the metal removal equipment may be installed in series subsequent to the processing equipment of the invention, for the metallic impurities to be removed after the carbon containing compounds are removed.

The treated synthetic silica powder of the invention may be next subjected to the normal fusion method in the manufacture of shaped products or finished articles for use in semiconductor or optics applications. Examples of articles employing the purified silica sand of the invention include quartz glass crucibles, bars, rods, plates which are used as components or semi-finished products for the semiconductor industry, for optics and optical communications systems.

EXAMPLES

In all examples, synthetic silica from Mitsubishi Kasei Corp. (MKC) having a starting carbon black level of >40 ppm is used as the starting material. Samples of 1000 g of MKC synthetic quartz powder is placed in a covered quartz container (200 mm by 200 mm by 150 mm) and the container is placed in an electric furnace. Oxidizing gas is introduced into the container at a rate of 1 liter per minute and the container is heated to the desired temperature at a rate of 200° C./hour and maintained for 2 hrs. After cooling naturally, the synthetic quartz glass powder is taken out and the carbon level is measured.

In example 1, quartz powder is treated with 100% $O_2$ at a temperature of 1500° C. for 12 hrs.

In example 2, quartz powder is treated with 100% $O_2$ at a temperature of 800° C. for 12 hrs.

In example 3, the quartz powder is treated in a flow of 71 vol. % He, 23 vol. % $O_2$, and the rest being ozone, at a temperature of 1150° C. for 6 hrs.

In example 4, the quartz powder is treated in a flow of 71 vol. % He, 23 vol. % $O_2$, and the rest being ozone, at a temperature of 900° C. for 6 hrs.

Example 5 is a comparative example, wherein quartz powder is not treated, but simply heated to 900° C. for 6 hrs.

Analytical results show that quartz powder being treated in the oxidizing gas environment comprising ozone of the invention has a carbon impurity level ranging from 2.5 ppm to 10 ppm, as compared to the comparative example with a carbon level of 45 ppm. The results also show that there is little difference between the carbon impurity level of examples 3 and 4.

Figure 2:
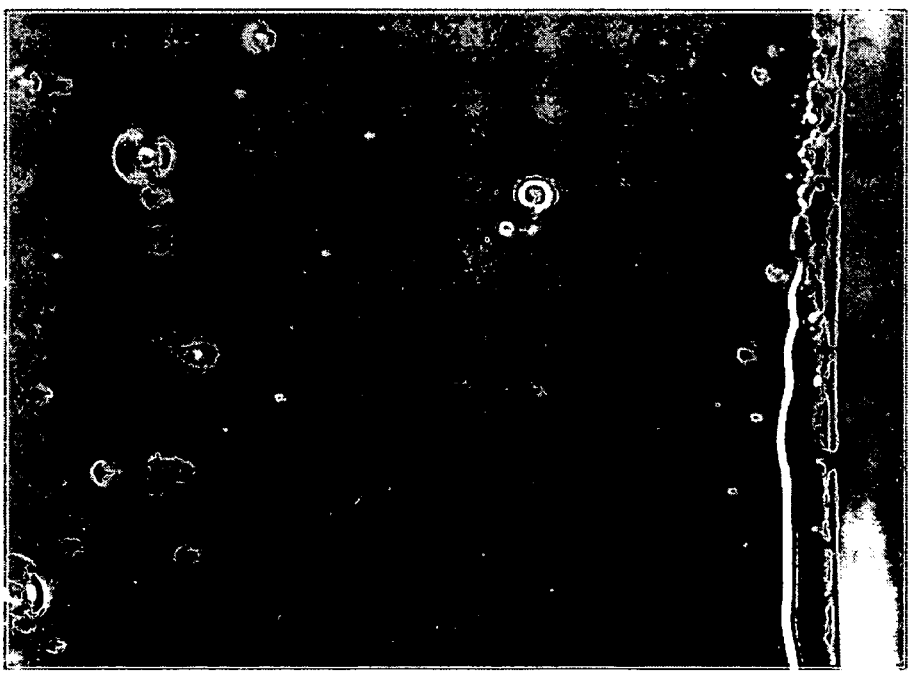
FIG. 2 is a Microphotograph illustrating a coupon sample from a crucible made with synthetic sand treated in the oxidizing environment of the present invention.

In another set of examples, treated sand from the examples above is used to make into test crucibles. The crucibles are then cut to obtain sample coupons and examined for the effects of the fusion process on the bubble density in the crucibles as fused. The samples are compared after fusion and a subsequent vacuum bake at 1500° C. for 12 hours to simulate the effect of a crystal-pulling run. FIG. 1 is an optical Microphotograpic image (taken at 40-50× magnification) of a sample from a crucible made with untreated sand, showing the growing bubbles. FIG. 2 is an optical Microphotograpic image (taken at 40-50× magnification) of a sample from a crucible made with the treated sand of Example 4, wherein there is bubble stability and less bubble growing as with the crucible made with the untreated sand of the prior art.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

We claim:

1. A method of purifying natural or synthetic silica powder by treating the silica powder in an oxidizing atmosphere comprising at least 3 vol. % ozone at a temperature of greater than 260° C. and less than 1400° C., to reduce carbon containing compound concentration in the silica powder to less than 10 ppm.

2. The method of claim 1, wherein the silica powder is treated in an atmosphere comprising at least 5 to 20 vol. % ozone to reduce carbon containing compound concentration in the silica powder to less than 5 ppm.

3. The method of claim 1, wherein the silica powder is treated in an atmosphere comprising at least 5 to 20 vol. % ozone to reduce carbon containing compound concentration in the silica powder to less than 2.5 ppm.

4. The method of claim 1, wherein the silica powder is treated in an atmosphere comprising from about 5 to about 20 vol. %. ozone to reduce carbon residuals to less than 2 ppm and OH group concentration to less than 50 ppm.

5. The method of claim 1, wherein the silica powder is treated in an atmosphere comprising at least 5 to 20 vol. % ozone at a temperature about 500° C. to about 1000° C.

6. The method of claim 1, wherein the silica powder is maintained in an atmosphere containing at least 3 vol. % ozone at a temperature of greater than 260° C. and less than 1400° C., for a period ranging from about 30 minutes to 15 hours.

7. The method of claim 1, wherein the silica powder is maintained in an atmosphere containing from 5 to 20 vol. % ozone at a temperature about 500 to about 1100° C., for a period of less than 12 hours.

8. The method of claim 1, wherein the silica powder is treated in an atmosphere containing at least 20 vol. % oxygen at a temperature of greater than 260° C. less than 1000° C. to reduce carbon containing compound concentration in the silica powder to less than 10 ppm.

9. The method of claim 1, wherein the silica powder is treated in an atmosphere containing at least 50 vol. % oxygen at a temperature ranging from about 500° C. to about 1000° C. to reduce carbon containing compound in the silica powder to less than 5 ppm.

10. The method of claim 1, wherein the silica powder is treated in an atmosphere containing at least 50 vol. % oxygen at a temperature ranging from about 500° C. to about 1000° C. to reduce carbon containing compound in the silica powder to less than 5 ppm.

11. The method of claim 1, wherein the silica powder is treated in an atmosphere containing at least 50 vol. % oxygen at a temperature ranging from about 500° C. to about 1000° C. for at least 5 hours to reduce carbon containing compound in the silica powder to less than 2.5 ppm.

12. The method of claim 1, wherein the silica powder is treated in an atmosphere comprising hot air ranging from about 500° C. to about 1000° C. reduce carbon containing compound concentration to less than 5 ppm.

13. The process of claim 1, wherein the silica powder treatment is carried out in a fluidized bed and wherein the oxidizing atmosphere is in a form of a treatment gas which is passed generally upward through the fluidized bed and the silica powder to be treated at a specific flow velocity.

14. The process of claim 13, wherein the temperature of the fluidized bed is maintained at a treatment temperature in a range of about 500° C. to about 1000° C.

15. The process of claim 13, wherein the treatment gas is heated prior to being introduced to the fluidized bed, to a temperature above the treatment temperature.

16. The process of claim 13, wherein the treatment gas has a flow velocity of at least 10 cm/s.

17. The process of claim 13, further comprising a first cleaning stage for the removal of metallic contaminations.

18. A method of purifying natural or synthetic silica by maintaining the silica powder under an oxidizing atmosphere comprising at least 60 vol. % oxygen and ozone at a temperature of less than 1000° C., causing carbon containing compounds to be driven off in gaseous form.

19. A method of producing synthetic silica having a carbon content of less than 5 ppm by heating a synthetic silica powder containing at least 45 ppm carbon content in an atmosphere comprising at least 3 vol. % ozone at a temperature of at least 200° C.

20. The method of claim 19, wherein said atmosphere comprises 3 to 10 vol. % ozone, 50 to 75 vol. % helium, and 20 to 40 vol. % oxygen.

21. The method of claim 19, wherein said heating is at a temperature of 200 to 1400° C. and from 2 to 24 hrs.

22. A method of purifying natural or synthetic silica, said method comprising treating said silica powder at a temperature of greater than 260° C. and less than 1400° C. with a gaseous stream comprising a sufficient amount of ozone to reduce carbon containing purities to a level of less than 5 ppm.

23. The method of claim 22, wherein said gaseous stream comprises an ozone concentration of less than 10 vol. %.

24. A quartz article comprising silica powder purified by the process of claim 1.

* * * * *